Patented Oct. 29, 1940

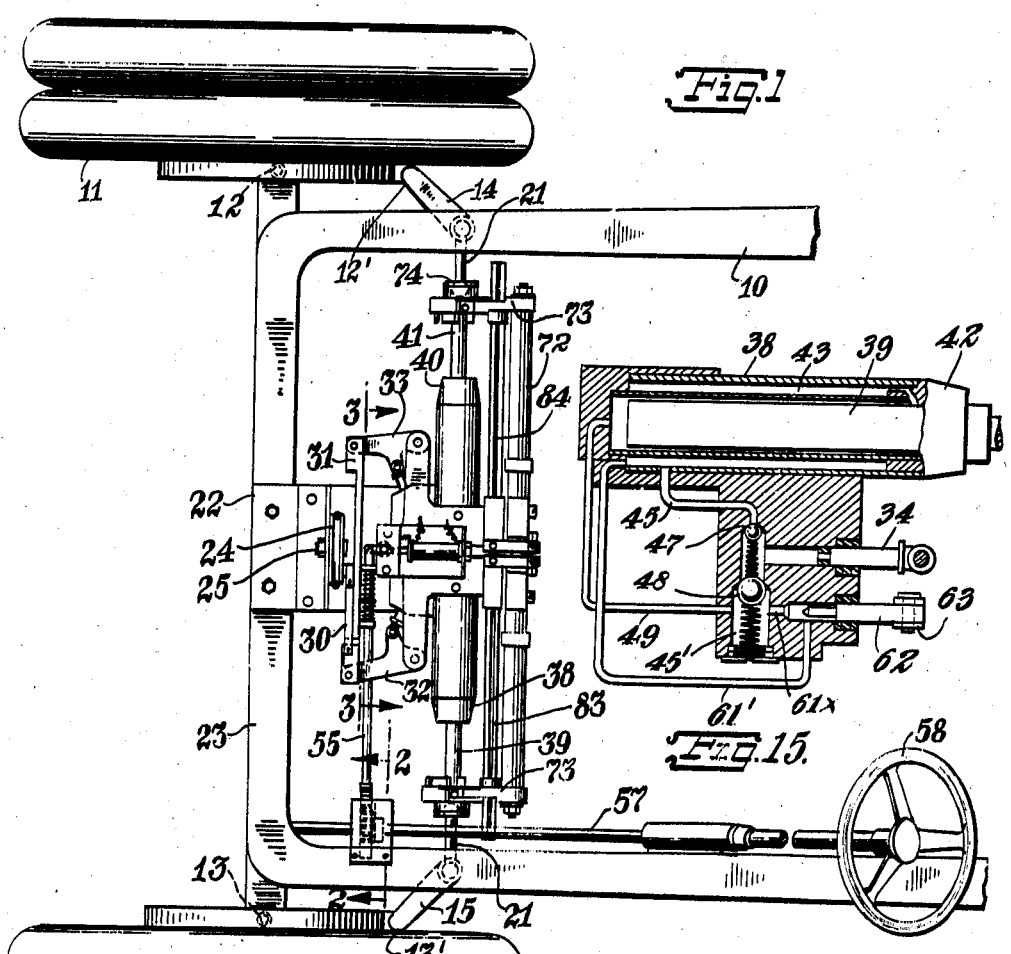
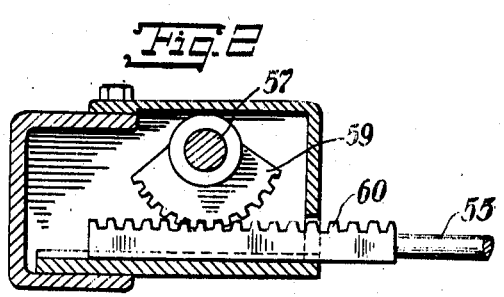
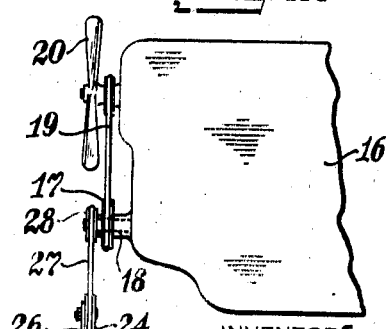

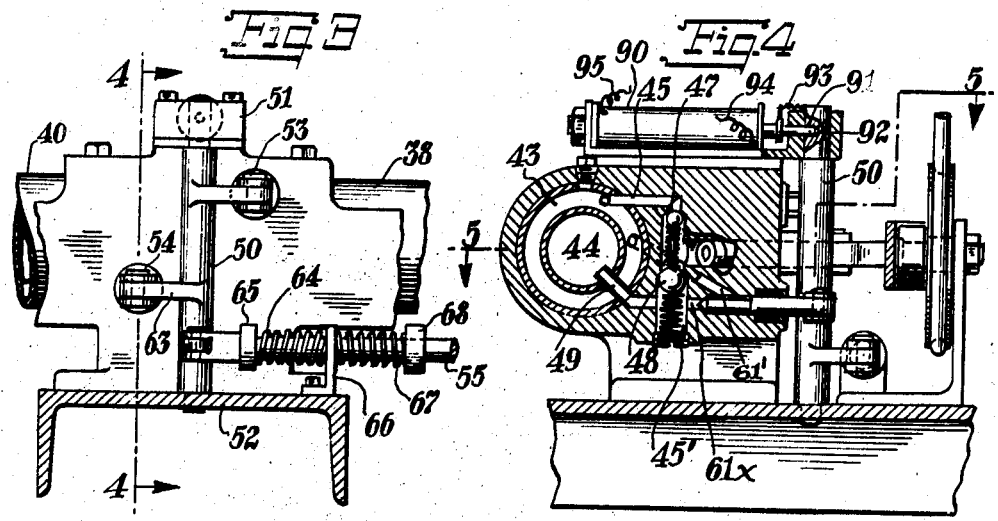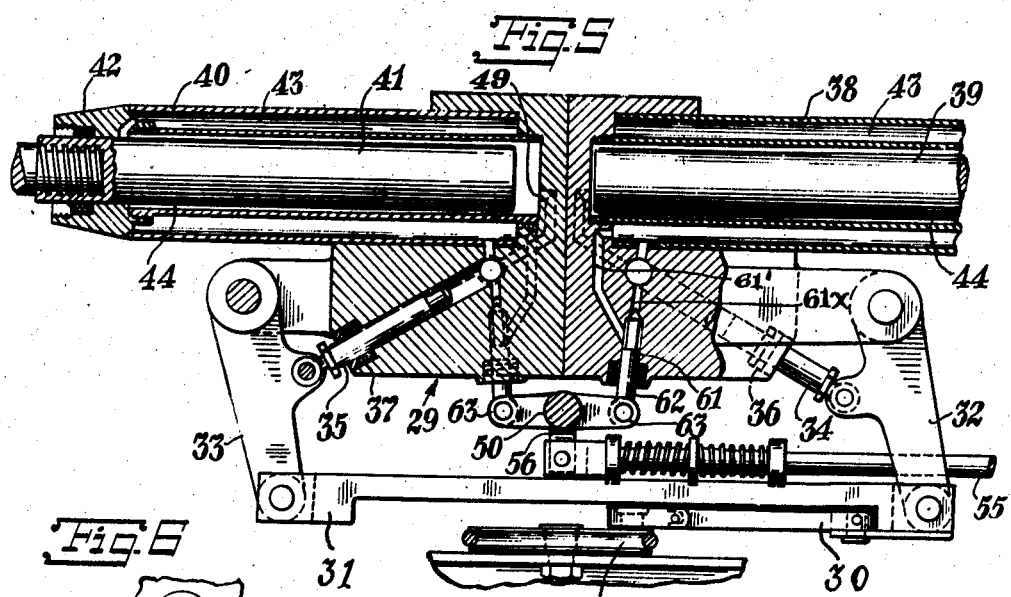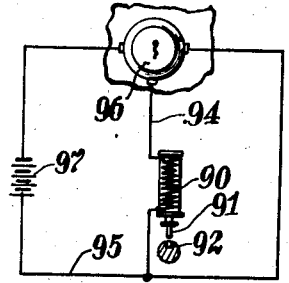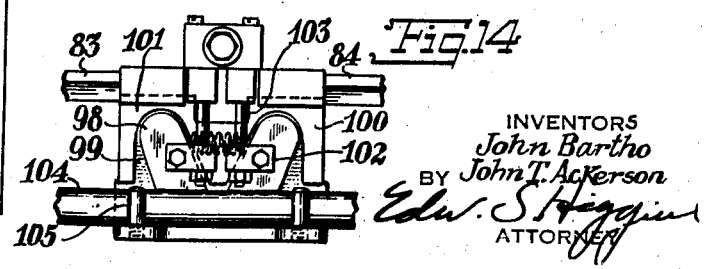

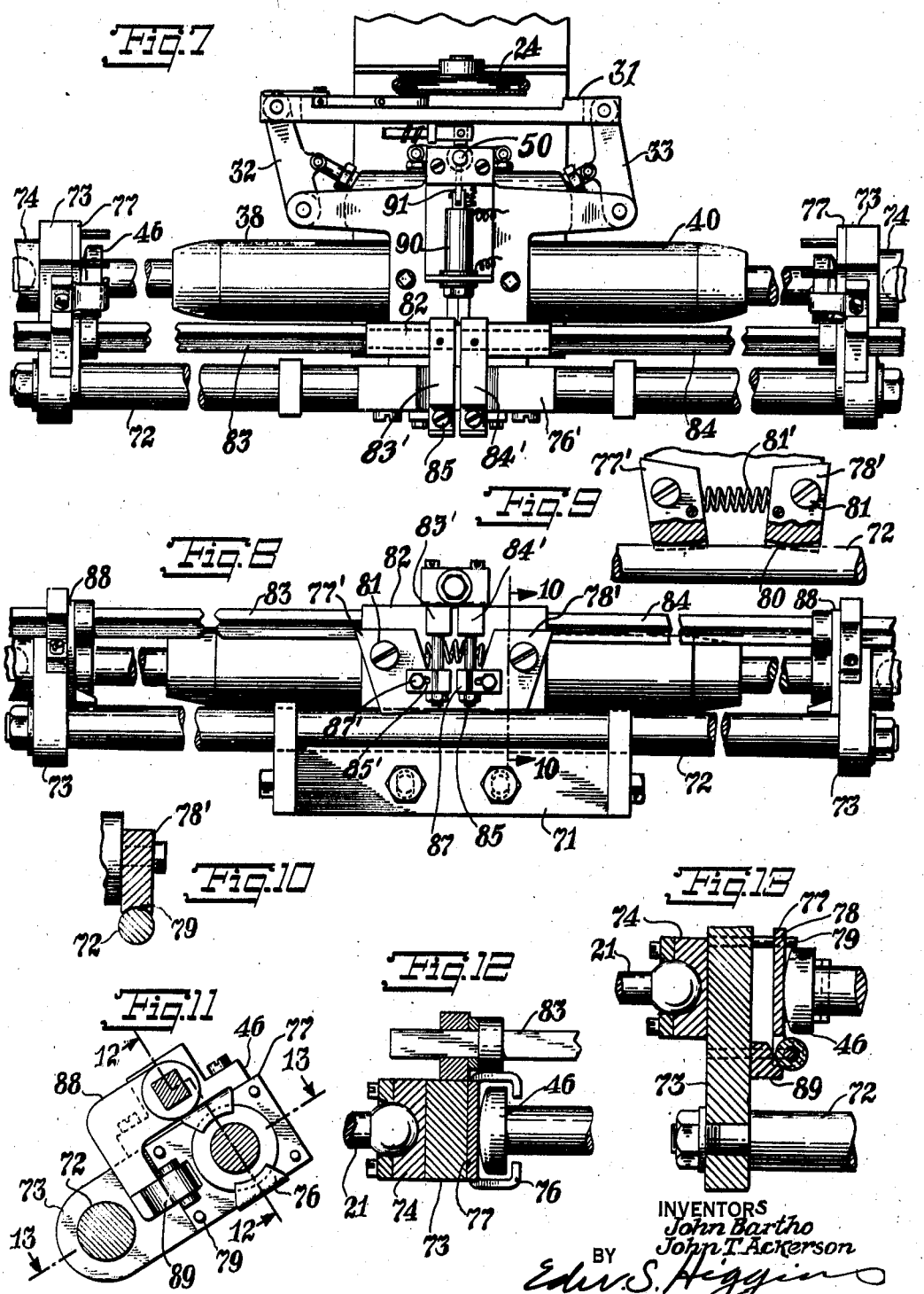

2,219,645

UNITED STATES PATENT OFFICE 2,219,645

POWER STEERING MECHANISM FOR AUTOMOBILES

John Bartho, New York, N. Y., and John T. Ackerson, Radburn Fair Lawn, N. J.

Application April 25, 1939, Serial No. 269,924

15 Claims. (Cl. 180—79.2)

This invention relates generally to automobiles and more particularly to mechanism for steering, for minimizing the effects of blow-outs and the like, for preventing and minimizing shocks and for locking the steering mechanism.

The commercial trucks of to-day are made so large and heavy that it is only with great muscular effort that the steering wheel is able to be turned especially if the truck is standing still or is mired in mud or the like. The same difficulty is also experienced with smaller passenger automobiles.

Furthermore when a blow-out or other accident occurs, the steering wheel and front wheels are usually twisted or knocked out of line resulting in a loss of control of the automobile.

Again when the front steering wheels come into contact with an obstruction on the road in its forward travel, there is an end thrust or shock imparted to wheels of the steering gear tending to twist them out of the intended line of direction against the efforts of the driver to hold them in line.

Also because of the great manual strength necessary to turn the steering wheel for steering purposes, manufacturers of automobiles have found it impractical to mount heavy wheels or more than a single wheel at each end of the front axle and as a result it was necessary to carefully limit the load on said front or steering wheels.

In accordance with the present invention, the motive power of the automobile is used for turning the steering wheels thereby permitting wheels of any desired size or of any number to be mounted on the front axle because manual strength as a factor in steering is reduced to a minimum. Furthermore the pay load can be distributed over the entire length of the automobile thereby permitting larger and heavier loads to be carried and thereby eliminating the necessity of trailers with extra wheels for taking up the load and thereby shortening the overall length of the automobile with consequent saving in storage and parking space, etc.

Our invention also contemplates means for normally locking the steering mechanism against unauthorized operation and also means for automatically unlocking said mechanism when the ignition mechanism is operated.

One object of the invention is to operate the steering mechanism by positive power from the motor of the automobile.

Another object is to provide mechanism for steering automobiles that is easy to manipulate, responsive to a minimum of manual effort and is positive in action.

Another object is to provide steering mechanism that is inexpensive to manufacture and that can be adapted to any standard type of front wheel mounting.

Still another object is to prevent accidental or unauthorized operation of the steering mechanism.

A further object is to prevent shocks and to provide smooth riding.

Still another object is to minimize the injurious effects of a blow-out or other accident.

A still further object is to keep the steering mechanism always under control.

Yet another object is to provide a hydraulically operated piston for steering purposes with the pressure entirely brought to bear at one end of the piston.

In the drawings,

Fig. 1 is a top plan view of the front of an automobile showing the improved steering mechanism, with the motor and associated parts omitted.

Fig. 1a is a side view showing the connection between the motor and grooved wheel for actuating the improved mechanism.

Fig. 2 is a detail view showing the connection between the steering post and valve actuating rod.

Fig. 3 is a detail view showing the valve mechanism for selectively supplying the cylinders.

Fig. 4 is a sectional view taken on the plane of the line 4—4 of Fig. 3.

Fig. 5 is a sectional view showing the pump and associated cylinders taken on the plane of the line 5—5 of Fig. 4.

Fig. 6 is a diagrammatic view of the circuit including the device for locking the steering mechanism.

Fig. 7 is a top plan view of the improved mechanism, parts being shown in section.

Fig. 8 is a rear view of the improved mechanism.

Figs. 9 and 10 are detail views of the braking shoes, partly in section, the latter view being taken on the line 10—10 of Fig. 8.

Fig. 11 is a detail view of the bracket and associated parts for holding the brake shoes up off the bar in inoperative position.

Fig. 12 is a detail view partly in section of the bracket and parts on the line 12—12 of Fig. 11.

Fig. 13 is a sectional view on the line 13—13 of Fig. 11 with the holding plate separated.

Fig. 14 is a modified form of braking shoe and mounting therefor.

Fig. 15 is a part sectional and part diagrammatic view showing the pump and cylinder connections.

The present improvements may be used with any standard type of automobile and for purpose of illustration we have shown the front portion of an automobile chassis 10 of ordinary construction mounting front steering wheels 11 on spindles (not shown) pivoted respectively at 12 and 13.

Steering arms 14 and 15 are rigidly connected at points 12' and 13', respectively, to the wheels 11 which arms 14 and 15 are usually connected by a single piece of metal tubing called a tie rod.

An internal combustion engine 16 of any ordinary type is mounted on the chassis and is provided with the usual grooved wheel 17 on a shaft 18 operated by the engine as is usual. The wheel 17 turns a belt 19 for turning the cooling fan 20, as is usual.

In the present instance, instead of the conventional single tie rod connecting the steering arms 14 and 15, a two-part tie rod 21 is provided, the two parts being spaced from each other, with the improved mechanism therebetween and connected to both parts.

The improved mechanism may be mounted as a unit on a casting or plate 22 secured to the cross beam 23 of the chassis in any suitable manner. This mechanism includes a grooved wheel 24 mounted on a stub shaft 25 supported by an upstanding flange 26 on the plate 22. Wheel 24 is driven by a belt 27 from a grooved wheel 28 mounted on the shaft 18 in front of the wheel 17. This wheel 24 operates a fluid pump or motor 29 by means of a crank shaft 30 which is eccentrically connected at one end to the face of one surface of the wheel 24. The other end of shaft 30 is hingedly connected to one end of a movable shaft or rod 31, which shaft is pivotally connected at its ends to arms 32 and 33 which pivotally support and move pump pistons or plungers 34 and 35, respectively, in cylinders 36 and 37, respectively, in the pump casing.

Connected to one side of the pump 29 is a cylinder or hydraulic jack device 38 having a piston or plunger 39, and to the other side a cylinder or jack device 40 having a piston or plunger 41. The pump is adapted to pump oil or other liquid through the system including cylinders 38 or 40 as desired.

Each of the cylinders 38 and 40 with its associated parts is of similar construction and a description of one will suffice. Each cylinder has an outer chamber 43 and an inner chamber 44, the outer chamber serving as an oil reservoir. Each cylinder has one end connected to the pump casing and its other end closed by a head portion 42. Movable in the inner chamber 44 of cylinder 38 is the piston or plunger 39 which projects or extends outside of the head 42 and movable in the inner chamber 44 of the cylinder 40 is the plunger 41. Secured to the outer end of each plunger is a ram head 46.

A passage or conduit 45 in the pump casing leads from the outer chamber 43 of each cylinder to the pump chamber 45' and another passage or conduit 49 leads from the chamber 45' to the inner chamber 44 of each cylinder. The chamber 45' has a restricted portion at one end of which a spring pressed check ball valve 47 is seated and blocks communication between passage 45 and the chamber 45' and another spring pressed ball valve 48 is seated between the restricted portion and the remainder of the chamber 45' and blocks communication between the chamber 45' and the passage 49 leading to the inner chamber 44 of each cylinder.

The return flow of oil from outer chamber 43 to inner chamber 44 in the jacks or cylinders 38 and 40 is controlled by valve mechanism mounted on a rockable post or lever 50 suitably supported for rocking movement between bearings 51 and 52. The flow in cylinder 38 is controlled by valve 53 and in cylinder 40 by valve 54. The valves 53 and 54 are similar in construction and both are actuated successively by a reciprocating rod 55 connected at one end to a stud 56 on the post 50 near its bottom end. This rod 55 is operatively connected to the steering post 57 and hand wheel 58 by means of a gear segment 59 on the end of the steering post engaging a rack 60 on the end of rod 55.

Each of valves 53 and 54 includes a cylinder 61 formed in the pump casing which communicates with the outer chamber 43 by a passage 61' and with the pump chamber 45' by a passage 61x. A plunger 62 pivotally connected to a stud 63 on the post 50 is adapted to block passage 61'. A coil spring 64 between a fixed sleeve 65 and a fixed bearing 66 on the rod 55 holds the valve 53 in fixed position and prevents it from becoming loose and rattling, and a similar spring 67 between bearing 66 and a fixed sleeve 68 serves the same purpose for the valve 54.

When the passage 61' of either cylinder is blocked by plunger 62, outward movement of pump plunger 34 or 35 will create a suction in that particular cylinder and displace the ball valve 47 allowing oil to flow from the outer chamber 43 through the conduit 45 to the chamber 45'. When the chamber 45' is filled with oil there is no more sucking action against ball 47 and the spring behind this ball 47 forces it back to its seat blocking the passage 45 to the outer chamber 43, and the following inward movement of said plunger 34 or 35 will displace the ball valve 48 permitting the oil to flow into the larger portion of chamber 45', and from this portion into and through conduit 49 into the inner chamber 44 of cylinder 38 behind the end of the plunger 39 or 41. The pressure of this oil behind said plunger will be effective in moving the plunger 39 or 41 outwardly of its cylindrical housing in the well known manner.

Mounted on a block 71 on the plate 22 and parallel with the cylinders 38 and 40 is a slidable bar 72. On each end of the bar 72 is a plate or flange 73, which extends inwardly beyond and in alignment with the adjacent cylinder whereby it is connected to the plungers of said cylinders.

Connected to the outside surface of each flange 73 by means of a universal joint connection 74 is the tie rod section 21. The tie rods 21 are connected to the steering arms 14 and 15.

Removably mounted on each of the ram heads 46 on the plungers 39 and 41 by means of spaced lugs 76 is a plate member 77, which plate member is normally flush up against the inner surface of the flange 73. Plate 77 is provided with openings 78 which loosely receive guide pins 79 on the inner surface of flange 73, and the ram head 46 is loosely interlocked between the lugs 76, thus permitting a little flexibility between the piston ram head 46 and the plate 77 in order to take up any slight disalignment between the slidable rod 72 and the piston, thus insuring a bearing surface for the piston ram head 46 under all conditions.

In operation, when the engine 16 is running, the shaft 31 is continuously reciprocated thereby keeping the pump pistons 34 and 35 moving in and out. The valves 53 and 54 normally have their pistons 62 positioned outwardly so that oil is not pumped through the system. When it is desired to turn the automobile to the right or left, the hand steering wheel 58 is turned to the right or left as is usual. This moves the rod 55 to the right or left, and this rod being connected to post 50 is adapted to move the pistons or plungers of valves 53 and 54 as will be understood. When the rod is moved in one direction, for instance, to the right as viewed in Fig. 5, it moves plunger 62 of valve 53 inwardly closing the passage 61' leading to outer chamber 43 of cylinder 38. Next the outward movement of the pump piston 34 will suck the ball valve 47 off its seat permitting oil to flow from outer chamber 43 through passage 45 into the restricted portion of pump chamber 45' filling up said chamber 45'. When the pump chamber 45' is filled with oil, there is no sucking action on ball 47 and the spiral spring behind the ball 47 forces it back on to its seat thus blocking passage 45. Upon the inward stroke of the piston 34, the oil in chamber 45' is forced against ball valve 48 forcing said ball off its seat permitting oil to flow from chamber 45' into and through passage 49 into the inner chamber 44 behind the piston 39. When the piston 34 has finished its inward stroke, there is no more pressure against the ball 48 and the spiral spring behind said ball forces it back on to its seat thus again blocking communication between the outer and inner chambers of the cylinder. When the oil flows into the inner chamber 44 behind the piston 39, said piston 39 is forced outwardly of the cylinder 38 by the pressure of the oil. This movement of the piston 39 moves the sliding bar 72 to the right as viewed in Fig. 1 by reason of its connection with the flange 73, and the movement of the sliding bar is imparted to the tie rod 21 and through arm 15 to the front or steering road wheel 11.

To permit the plunger 39 to return or move inwardly, the rod 55 is moved backwardly or to the left which will move the piston 62 of valve 53 outwardly of its cylinder 61 and away from passage 61' and the oil will be forced out of the inner chamber 44 through passage 49 into the pump chamber 45' and from chamber 45' into and through passage 61' into the outer chamber 43. When the rod is moved to the left, the piston 62 of valve 54 is moved inwardly to block the passage 61' leading to the outer chamber 43 of cylinder 40 and the oil is forced by pump 35 through the system of cylinder 40 the same as was done in the system of cylinder 38 thus forcing the piston 41 outwardly and moving the sliding bar 72 to the left as viewed in Fig. 1 which carries the piston 39 of cylinder 38 inwardly and which moves the steering wheels 11 in the other direction.

An important feature of the present invention is the mechanism for minimizing the effects of a blow-out or other accident. As is well known, when a tire is blown out or when a wheel meets with an obstruction the front steering wheels and steering gear are jerked out of alignment and out of control of the driver. This usually means a movement of the tie rod to the right or left. In the present invention, means have been provided for instantaneously resisting the sliding movement of the tie rod members 21 by resisting the lateral movement of the slidable bar 72.

Pivotally mounted on a block 76' are brake shoes 77' and 78'. The lower surface of each shoe is formed with a horizontally disposed groove 79 conformable to the shape of the upper surface of the bar 72, which groove takes a slight upward turn forming an inclined camming face portion 80. Each shoe is mounted on an eccentrically disposed pivot pin 81 and is positioned sufficiently close to the slidable bar 72 so that when the shoe is in downward position, its grooved surface grips the bar 72 and holds it against sliding movement. The relative positions of the shoes and bar 72 and the shape of the grooved lower surface are such that when the shoe is in downward position it grips the bar 72 and any tendency of the bar 72 to move to the left as viewed in Fig. 8 will cause the bar to engage the inclined face portion 80 of shoe 77' and cause a further gripping action between the shoe and bar. When the bar 72 moves to the right as viewed in Fig. 8, it engages the shoulder 80 of the shoe 78' with the same gripping effect. It will thus be seen that the more the bar moves the harder it is gripped by the shoes, when the latter are in gripping position.

A strong spiral spring 81' is positioned between the shoes and is so disposed that it normally urges the shoes apart and when resistance is removed from said brake shoes, said spring moves the shoes downwardly into gripping position on the rod 72 with a snap action.

Rockingly mounted in blocks 82 are aligned shafts 83 and 84. These shafts are positioned parallel with the slidable rod 72 and each is round in cross section where it is mounted in the block 82 and is square for the remainder of its length. These shafts are rigidly connected to arms 83' and 84', which arms are slidably or loosely connected to brake shoes 77' and 78' by means of pins 85 mounting brackets 87, which brackets are connected by pins 87' passing through elongated slots 85' in the brackets to the shoes 77' and 78'. Secured to the outer end of each of the rock shafts 83 and 84 is a bell crank lever or bracket 88, the free end of which extends inwardly toward plate 77 and supports thereon a lug or nose 89. These brackets 88 are so positioned relative to the flanges 73 that their nose portions 89 are normally in engagement with the inner edges of movable plates 77 mounted on the heads 46 of the plungers. This engagement prevents rocking of the shafts 83 and 84, and because of the connection between the shafts and the shoes, the shoes 77' and 78' are normally held up off the rod 72 and are prevented from being swung downwardly to bar gripping position.

The braking mechanism operates as follows: When a blow-out, for example, occurs, there is always a powerful jerk on the front steering wheels to the right or left as the case may be. Because these wheels are connected to the slidable bar 72, this jerking will be imparted to and will move said bar to the right or left at a much greater speed than the movement of either plunger 39 or plunger 41, with the result that the bar 72 with its flange 73 will move away from the adjacent plunger and its attached plate 77. As soon as the flange 73 moves away from the plate 77, the engagement between said plate 77 and the bracket 88 on the end of rockable shaft 83 or 84 is broken, with the result that the resistance to the action of the spiral spring 81' is removed and this spring moves the brake shoe 77' or 78' which is connected to said rockable shaft, downwardly with a snap action into gripping position thus resisting any further lateral movement of the slidable bar 72. Thus it will be seen that the blow-out caused the front wheels 11 to move laterally carrying the slidable bar 72 laterally away from the plunger head and its attached plate 77, thus automatically and instantaneously permitting the spiral spring 81' to come into play and snap the connected brake shoe downward to grip the slidable bar to resist any further movement laterally, and thus prevent the front steering wheels 11 from moving any further out of alignment.

In Fig. 14 is shown a modified form of brake shoe and mounting therefor. In this form the brake shoe 98 is formed with a rounded upper end and is floatingly mounted in an opening 99 in the wall 100 of the block 101, which opening is of a shape similar to the shape of the shoe and is only slightly larger than the brake shoe so as to permit only limited rocking movement of the shoe therein. The bottom of the shoe is connected to either rocking shaft 83 or 84 by means similar to that for the brake shoes 77' and 78' including an arm 102 and a pin 103 in order to hold it up off of the sliding bar 104. This brake shoe 98 has no bolt 81 and its movement is limited by the wall of opening 99. It is snapped into bar gripping position by the spiral spring when the rock shaft is released, and the strain is taken by the wall of the opening when the bar is jammed against it. Pins 105 hold the bar 104 against lateral movement.

The present invention also contemplates improved mechanism for locking the steering mechanism against unauthorized use. This is accomplished by providing means for preventing movement of the post 50 which mounts the valves 53 and 54. This mechanism includes a solenoid 90 having a movable core member 91. Post 50 is provided with a slot 92 and the solenoid is positioned sufficiently close thereto so that when the core 91 is in outwardly extended position by means of the spring 93, it extends into the slot 92 thereby preventing rotation of the post and thus preventing actuation of the valves controlled thereby. The solenoid device is in circuit through conductors 94 and 95 with the ordinary locking cylinder 96 which is part of the ignition system of the automobile. When the key (not shown) is inserted into the locking cylinder and turned to start the ignition system, the solenoid is energized by the battery 97 and its core member 91 is drawn inwardly and out of the slot 92 thus releasing the post 50 for turning movement as will be understood. When the ignition system is turned off, the solenoid becomes deenergized and the spring 93 pulls the core 91 into the slot 92 thereby locking the mechanism.

The improved mechanism may also be used as a jack device for lifting purposes. If the plate or flange 73 and the supported cylinders, pistons and sliding bar 72 are positioned vertically instead of horizontally as illustrated, it will be understood that the pistons and sliding bar will move vertically upwards under pressure.

It will be understood of course that parts of the improvements may be used without other parts without departing from the principle of the invention and that changes in details may be made without departing from the principle of the invention.

It will also be understood that modifications may be made and other purposes served without departing from the spirit and scope of the invention, and it is desired to be limited only by the state of the prior art and the appended claims.

We claim:

1. In power steering mechanism for automobiles, in combination, an internal combustion engine, a fluid pump operatively connected to said engine, a pair of aligned cylinders in communication with said pump, a plunger in each of said cylinders movable outwardly thereof, a plate removably and flexibly carried on the outer end of each plunger, a slidable bar parallel to said aligned cylinders, flanges on the ends of said bar detachably connected to said plates whereby said bar is reciprocated, tie rods operatively connected to said bar and steering wheels operatively connected to said tie rod.

2. In power steering mechanism for automobiles, in combination, an internal combustion engine, a fluid pump operatively connected to said engine, a pair of aligned cylinders in communication with said pump, a plunger in each of said cylinders movable outwardly thereof, a plate removably carried on the outer end of each plunger, a slidable bar parallel to said aligned cylinders, flanges on the ends of said bar, tie rods operatively connected to said bar, steering wheels operatively connected to said tie rods and releasable and flexible means of connection between the flanges and plates.

3. In power steering mechanism for automobiles, in combination, an internal combustion engine, a fluid pump operatively connected to said engine, a pair of aligned cylinders in communication with said pump, a plunger in each of said cylinders movable outwardly thereof, a plate removably and loosely carried on the outer end of each plunger, a slidable bar parallel to said plungers, flanges on the ends of said bar, tie rods operatively connected to said bar, steering wheels operatively connected to said tie rods, said plates having openings and guide pins on said flanges adapted to extend loosely into said openings.

4. In power steering mechanism for automobiles, in combination, an internal combustion engine, a fluid pump operatively connected to said engine, a pair of aligned cylinders in communication with said pump, a plunger in each of said cylinders movable outwardly thereof, valve means for controlling the communication between said pump and cylinders, a slidable bar parallel to said pistons, flanges on the ends of said bar operatively and loosely connected to the free ends of said plungers whereby said bar is reciprocated, tie rods operatively connected to said plungers, steering wheels operatively connected to said tie rods and means for actuating said valve means including a hand wheel and a rod operatively connected to said wheel.

5. In steering mechanism for automobiles, a pair of spaced tie rods for steering the wheels, a slidable bar for connecting said rods and moving the same laterally, means for sliding said bar and mechanism including a pivoted brake shoe eccentrically mounted and spring pressed for resisting lateral movement of the bar.

6. In steering mechanism for automobiles, a pair of spaced tie rods for steering the wheels, a slidable bar for connecting the rods and moving the same laterally, means for sliding said bar, and mechanism for resisting lateral movement of the bar including a pivoted brake shoe eccentrically mounted, a device including a rock shaft and pin for normally holding the shoe off the bar and a spring for moving said shoe onto the bar with a snap action when the holding device is removed from operative position.

7. In steering mechanism for automobiles, a pair of spaced tie rods for steering the wheels, a slidable bar for connecting the rods and moving the same laterally, oppositely movable pistons for sliding said bar and mechanism for resisting lateral movement of the bar when the front road wheels meet with an obstruction including a pair of spaced and aligned rockable shafts, a brake shoe adjacent each shaft, a pin on each shaft for holding its respective shoe off the bar and spring means for moving the shoes into braking engagement with the slidable bar with a snap action when the holding pin is rocked downwardly.

8. In power steering mechanism for automobiles, a pair of steering arms for steering the wheels, spaced tie rods connected to said steering arms, a slidable bar between and connected to said tie rods for moving the same laterally, oppositely movable pistons normally in engagement with said slidable bar for moving the same laterally, and mechanism for preventing lateral movement of the slidable bar when said bar becomes disengaged from one of said pistons, said mechanism including a rockable shaft normally held against rocking by the engagement of the piston with the bar, a brake shoe connected to said rockable shaft and adapted to engage the slidable bar and spring means for rocking said shaft and brake shoe into bar gripping position upon the disengagement of the piston and bar.

9. In power steering mechanism for automobiles, a pair of steering arms for steering the wheels, spaced tie rods connected to said steering arms, a slidable bar between said tie rods, flanges on the ends of said bar connected to said tie rods, plates on the faces of said flanges, oppositely movable pistons detachably connected to said plates for moving the bar laterally, a pair of spaced aligned rockable shafts parallel with said pistons, brackets on the ends of the rockable shafts normally in engagement with said plates to prevent rocking of the shafts, brake shoes connected to said rockable shafts and adapted to engage the slidable bar to resist movement thereof, and spring means for moving said brake shoes into bar gripping position when the plates are moved away from the pistons.

10. In power steering mechanism for automobiles, a motor, a fluid pump operatively connected to the motor, a pair of aligned cylinders, a plunger in each of said cylinders, means of connection between the pump and cylinders for actuating said plungers including separate passages between the pump and said cylinders for supplying liquid pressure behind one end of each of said plungers, valve means for controlling the flow of fluid through said passages including a rockable lever, plungers on the lever adapted to block said passages, a reciprocable rod connected to said lever for rocking the same, means of connection between said reciprocable rod and the steering post for actuating the rod, tie rods connected to said slidable bar, means of connection between said slidable bar and said plungers for moving said bar including a flange on each end of said bar and detachable means of connection between said heads and the flanges including pins on said flanges and a plate carried by each head having openings for receiving said pins.

11. In power steering mechanism for automobiles, in combination with the locking cylinder of the ignition system, a fluid pump operatively connected to the automobile engine, mechanism for steering the wheels actuated by said pump including a valve with a rotatable member and a solenoid in circuit with said locking cylinder and having a movable core member adapted to interlock with said rotatable member for locking the steering mechanism.

12. In a steering mechanism for automobiles, a pair of spaced tie rods for steering the wheels, a slidable bar operatively connected to said rods for moving the same laterally, means for sliding said bar, and mechanism for automatically resisting sliding of said bar in either direction when the wheels meet with an obstruction, said mechanism including a pair of brake shoes adapted to be moveed into braking engagement with the sliding bar, each shoe of the pair having oppositely inclined camming faces adapted to engage the sliding rod to resist its movement in opposite directions.

13. In an automobile steering gear, means for resisting the movement of the wheels from any position to which they are moved by the steering mechanism, said means comprising the combination with the supporting axle and the leading wheels and the tie rods by which movement from the steering wheel is transmitted to the spindle arms of the axle ends, of a sliding bar connected to the tie rods in a manner to resist endwise movement in relation thereto, means adapted to be rocked into braking engagement with the sliding bar for resisting movement of the sliding bar, means cooperative with the movement of the steering wheel to turn the vehicle for withdrawing the braking means which resists movement of the tie rods as desired, said means comprising two positively moving pistons adapted to engage said tie rods and means connecting the pistons to the sliding bar whereby movement of the pistons in either direction will withdraw the braking means which resists movement of the sliding bar in that direction.

14. In power steering mechanism for automobiles, the combination with the engine and steering post, of a liquid pump operatively connected to the engine, two oppositely disposed cylinders, each having a liquid chamber in communication with the pump whereby the liquid is forced throughout the cylinder system, a piston in each cylinder adapted to be moved by said liquid outwardly of the cylinder, a tie rod operatively connected to each piston and movable thereby, a steering wheel operatively connected to each tie rod and valve mechanism for controlling the flow of liquid to either of said cylinders, said valve mechanism including a valve casing having passages leading to the interior of said cylinders, plungers adapted to be moved into and out of said passages, a rocking lever adapted to move said plungers and a slidable rod operatively connected to the steering post for rocking said lever.

15. In a power steering mechanism for automobiles, a pair of opposed cylinders, each cylinder having an outer chamber for storing liquid and an inner chamber and a piston in each of said inner chambers, a pump for forcing the liquid from the outer to the inner chambers, valve mechanism for controlling the return flow of liquid from the inner to the outer chambers, said mechanism including a valve chamber, a passage from the inner chamber to the valve chamber, a passage from the valve cylinder to the outer chamber communicating with said first named passage, a plunger movable in said valve chamber and adapted to block said second named passages and spring means tending to prevent said plungers from oscillating in said valve chambers.

JOHN BARTHO
JOHN T. ACKERSON.